Oct. 11, 1966 D. KATZ 3,278,356
METHOD FOR FASTENING PERFORATED PROPELLANT
STICKS TO A SUSPENSION PLATE
Filed May 31, 1963

INVENTOR.
Daniel Katz

3,278,356
METHOD FOR FASTENING PERFORATED PROPELLANT STICKS TO A SUSPENSION PLATE
Daniel Katz, New York, N.Y., assignor to the United States of America as represented by the Secretary of the Army
Filed May 31, 1963, Ser. No. 284,761
3 Claims. (Cl. 156—294)

The invention described herein may be manufactured and used by or for the Government for governmental purposes without payment to me of any royalty thereon.

This invention relates to a means for securing a propellant stick to a suspension plate for head end suspension propellant systems used particularly in small unguided rockets.

Prior to the present invention, the propellant sticks were attached to the suspension plate by means of screws. A drop of a suitable resin, such as a styrene polyester, for example, was applied to the grain perforation surface. Tapered screws were pushed into the resin and the ends of the grains until the screws were snug against the perforation.

While this screw suspension method was a fairly satisfactory arrangement, a number of drawbacks became increasingly apparent. It became apparent that the foregoing process was not adaptable to automation because it was difficult to dispense a viscous potting compound having a long cure time and a limited pot life. Other problems such as the resin oozing out around the screw head during curing, the decrease in pull strength after extended storage at 140° F., and the change of ballistic characteristics resulting from the resin running during potting and extending the inhibited surface have been eliminated by the present invention.

It is, therefore, the primary object of the present invention to devise a head end suspension propellant system which will readily adapt to automation methods.

Another object of this invention is to devise a fastening means for propellant sticks which will not weaken during extended storage.

Other objects will become apparent to those skilled in the art from the drawing and the following disclosure.

Practical embodiments of the present invention may be further illustrated by the accompanying drawing, wherein.

Figure 1:
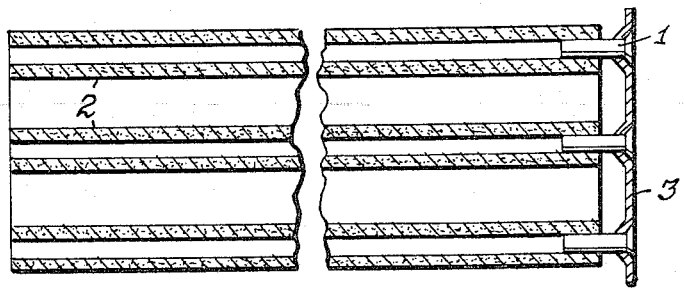
FIG. 1 illustrates a head end suspension propellant charge assembly.

Referring to FIG. 1, a side view of the circular charge assembly is shown. The plastic jacketed suspension pins 1 hold the perforated propellant grain 2 against the suspension plate 3.

Figure 2:
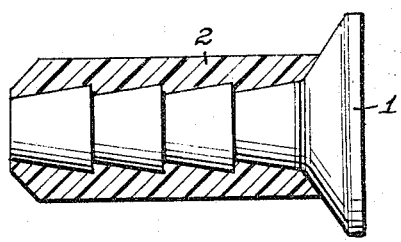
FIG. 2 illustrates a plastic jacketed insert assembly.

FIG. 2 shows a side view of the plastic jacketed insert. The insert 1 is metal, preferably aluminum alloy, which is sheathed in a cellulose material such as ethyl cellulose or cellulose acetate.

Figure 3:
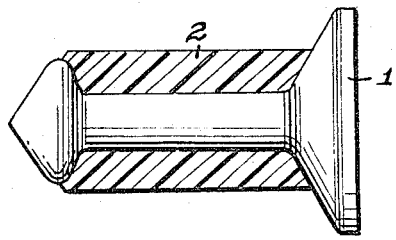
FIG. 3 illustrates a plastic jacketed rivet assembly.

FIG. 3 shows a side view of the plastic jacketed rivet. The rivet 1 is metal, preferably aluminum alloy, which is sheathed in a cellulose material such as ethyl cellulose or cellulose acetate.

While the drawings show two specific embodiments of the shape of the metal core, it is readily seen that any irregular shapes, such as notches, grooves, or serrations, on the shank of the pin will give a better binding surface to the plastic jacket. Thus numerous other variations in pin design may be employed and are contemplated to be within the scope of this invention.

Propellant sticks are secured to the suspension plate according to the present invention by plastic jacketed pins. The pins are dipped into a mutual solvent and inserted into the propellant grain perforation. After the plastic jacketed pin is pressed into the grain, the temperature is raised to dry the solvent. This method of assembly is safe and ideally suited for automation. The mutual penetration of the solvent into the plastic and the propellant produces a mechanical bond which is intimate, strong and chemically stable with respect to the propellant. Processes involving molding of the plastic into the propellant would be hazardous because of the high temperatures involved and would not be adaptable to an automated process. Temperatures in excess of 140° F. are not considered desirable for processing the propellant assembly, both from the standpoint of hazard and propellant degradation.

Ethyl cellulose and cellulose acetate are the most satisfactory materials for the plastic jackets. These two compounds were the only plastic materials which were found to effectively bond nitrocellulose base propellants where the bond results from mutual solubility in a given solvent.

An ELBA solvent, 35% by volume ethyl lactate and 65% by volume butyl acetate, is the most satisfactory when using ethyl cellulose jacketed pins, while acetone has been found to be the most satisfactory solvent for cellulose acetate jacketed pins. Just enough solvent is applied to start dissolution and to soften both the plastic and the propellant to a moderate depth surrounding the surface of contact. The amount of solvent applied is not too critical since it is subsequently driven off. However, if excess solvent is applied, there is a possibility of grain deformation at the pin contact end, and if insufficient solvent is applied there is risk of an inadequate bond. Generally, a moderately rapid dip of the plastic jacketed pin in the solvent will provide a sufficient coating of solvent for the purposes of this invention.

Of course, it is to be understood that the present concept may be equally as applicable to ingredients other than those disclosed. The pin designs and fastening methods are only exemplary, and numerous modifications are possible so long as the basic concept of solvent bonding is maintained.

I claim:

1. A method for fastening perforated propellant sticks to a suspension plate comprising dipping plastic jacketed pins in a liquid which is mutually solvent with respect to the plastic jacket and to the propellant stick, inserting the plastic jacketed pin in the propellant perforation, and raising the temperature to remove the solvent.

2. The method of claim 1 wherein said pins are jacketed by ethyl cellulose and said liquid solvent is a material consisting of 35% by volume ethyl lactate and 65% by volume butyl acetate.

3. The method of claim 1 wherein said pins are jacketed by cellulose acetate and said liquid solvent is acetone.

References Cited by the Examiner
UNITED STATES PATENTS

| | | | |
|---|---|---|---|
| 1,713,285 | 5/1929 | Juergens | 156—293 X |
| 2,304,036 | 12/1942 | Tegarty | 156—293 X |
| 2,383,230 | 8/1945 | Voke | 156—308 X |
| 3,107,573 | 10/1963 | Butcher | 86—1 |

EARL M. BERGERT, *Primary Examiner.*
HAROLD ANSHER, *Examiner.*